(12) United States Patent
Uchida (10) Patent No.: US 10,403,976 B2
(45) Date of Patent: Sep. 3, 2019

(54) ANTENNA AND WIRELESS COMMUNICATION APPARATUS

(71) Applicant: NEC Platforms, Ltd., Kawasaki-shi, Kanagawa (JP)

(72) Inventor: Jun Uchida, Kanagawa (JP)

(73) Assignee: NEC PLATFORMS, LTD, Kanagawa (JP)

( * ) Notice: Subject to any disclaimer, the term of this patent is extended or adjusted under 35 U.S.C. 154(b) by 138 days.

(21) Appl. No.: 15/506,811

(22) PCT Filed: Sep. 11, 2015

(86) PCT No.: PCT/JP2015/004640
§ 371 (c)(1),
(2) Date: Feb. 27, 2017

(87) PCT Pub. No.: WO2016/042747
PCT Pub. Date: Mar. 24, 2016

(65) Prior Publication Data
US 2017/0294952 A1 Oct. 12, 2017

(30) Foreign Application Priority Data

Sep. 19, 2014 (JP) .................................. 2014-190945

(51) Int. Cl.
*H04B 1/00* (2006.01)
*H01Q 5/321* (2015.01)
(Continued)

(52) U.S. Cl.
CPC .............. *H01Q 5/321* (2015.01); *H01Q 1/38* (2013.01); *H01Q 5/328* (2015.01); *H01Q 5/371* (2015.01);
(Continued)

(58) Field of Classification Search
CPC ........ H01Q 5/321; H01Q 5/328; H01Q 5/378; H01Q 5/371; H01Q 1/38; H01Q 1/243;
(Continued)

(56) References Cited

U.S. PATENT DOCUMENTS 8,552,916 B2* 10/2013 Hossain ................... H01Q 7/00
343/745
2004/0246188 A1 12/2004 Egashira
(Continued)

FOREIGN PATENT DOCUMENTS

CN 1574456 A 2/2005
CN 103748741 A 4/2014
(Continued)

OTHER PUBLICATIONS

International Search Report for PCT Application No. PCT/JP2015/004640, dated Nov. 24, 2015.
(Continued)

*Primary Examiner* — Michelle M Koeth (57) ABSTRACT

In order to provide an antenna that is small and resonates at a plurality of frequencies, an antenna according to the present invention is provided with: a first conductor of a ring shape, having an air gap; a second conductor arranged inside the ring, with both ends of the second conductor connected to the first conductor, having a first gap; and a third conductor arranged in a region surrounded by a part not including the air gap out of the first conductor, and the second conductor, with both ends connected to the first conductor, having a second gap, and a value obtained by multiplying a length of an outer periphery of a region surrounded by a part including the air gap out of the first conductor, and the third conductor, by capacitance of the air gap is different from a value obtained by multiplying a length of an outer periphery of a region surrounded by the second conductor, the third
(Continued)

conductor, and the first conductor, by capacitance of the first gap.

3 Claims, 12 Drawing Sheets

(51) Int. Cl.
| | | |
|---|---|---|
| *H01Q 1/38* | (2006.01) | |
| *H01Q 5/371* | (2015.01) | |
| *H01Q 9/42* | (2006.01) | |
| *H01Q 5/328* | (2015.01) | |
| *H01Q 5/378* | (2015.01) | |
| *H04B 1/69* | (2011.01) | |
| *H04B 1/707* | (2011.01) | |
| *H04B 7/08* | (2006.01) | |

(52) U.S. Cl.
CPC ............... *H01Q 5/378* (2015.01); *H01Q 9/42* (2013.01); *H04B 1/0053* (2013.01); *H04B 1/69* (2013.01); *H04B 1/707* (2013.01); *H04B 7/0814* (2013.01)

(58) Field of Classification Search
CPC .......... H01Q 9/42; H04B 1/0053; H04B 1/69; H04B 1/707; H04B 1/0814
See application file for complete search history.

(56) References Cited

U.S. PATENT DOCUMENTS

| | | |
|---|---|---|
| 2007/0139270 A1 | 6/2007 | Takei et al. |
| 2013/0169496 A1 | 7/2013 | Miyoshi et al. |
| 2013/0249765 A1* | 9/2013 | Su .......................... H01Q 1/243 343/850 |
| 2014/0203993 A1* | 7/2014 | Toyao .................... H01Q 13/10 343/867 |

FOREIGN PATENT DOCUMENTS

| | | | |
|---|---|---|---|
| EP | 2280447 A2 | 2/2011 | |
| GB | 2463536 A | 3/2010 | |
| JP | WO 2013027824 A1 * | 2/2013 | ............ H01Q 13/10 |
| JP | 2013-138296 A | 7/2013 | |
| WO | 2010/035317 A1 | 4/2010 | |
| WO | 2013/027824 A1 | 2/2013 | |

OTHER PUBLICATIONS

English translation of Written opinion for PCT Application No. PCT/JP2015/004640.
Chinese Office Action for CN Application No. 201580049928.1 dated Mar. 4, 2019 with English Translation.

* cited by examiner

ANTENNA AND WIRELESS COMMUNICATION APPARATUS

This application is a National Stage Entry of PCT/JP2015/004640 filed on Sep. 11, 2015, which claims priority from Japanese Patent Application 2014-190945 filed on Sep. 19, 2014, the contents of all of which are incorporated herein by reference, in their entirety.

TECHNICAL FIELD

The present invention relates to an antenna and a wireless communication apparatus.

BACKGROUND ART

As a small antenna element, an SRR antenna using a Split Ring Resonator (hereinafter referred to as "SRR") is put to practical use. PTL 1 discloses an implementation method for the SRR antenna. On the other hand, an antenna of a wireless communication terminal represented by a recent smartphone requires, in addition to smallness of the element itself, ingenuity of multi-frequency resonance such as two frequencies for communication in a plurality of frequencies. Then, Japanese patent application No. 2012-248169 discloses, as a technique corresponding to two frequencies by using the SRR antenna, a method of arranging two SRR antenna elements side by side that resonate with different frequencies, and feeding power to the antenna elements simultaneously.

CITATION LIST

Patent Literature

[PTL 1] International Publication No. 2013-027824

SUMMARY OF INVENTION

Technical Problem

Figure 15:
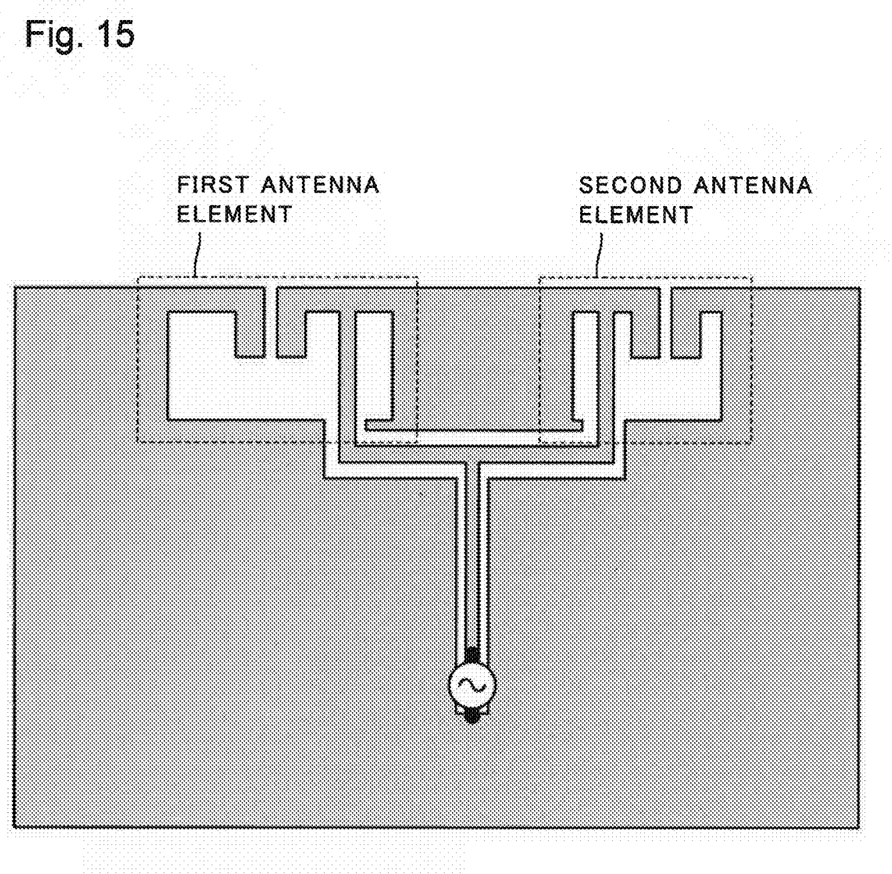
FIG. 15 is a diagram depicting a related configuration example.

In the method disclosed in Japanese patent application No. 2012-248169, two SRR antenna elements with a different resonance frequency are arranged side by side in order to correspond to two frequencies, as shown in an example illustrated in FIG. 15, which interferes with downsizing designing of an apparatus.

An object of the present invention is to provide an antenna that is small and resonates at a plurality of frequencies.

Solution to Problem

An antenna including: a first conductor of a ring shape, having an air gap; a second conductor arranged inside the ring with both ends of the second conductor connected to the first conductor, having a first gap; and a third conductor arranged in a region surrounded by a part not including the air gap out of the first conductor and the second conductor with both ends of the third conductor connected to the first conductor, having a second gap, and being characterized by a value obtained by multiplying a length of an outer periphery of a region surrounded by a part including the air gap out of the first conductor and the third conductor, by capacitance of the air gap, being different from a value obtained by multiplying a length of an outer periphery of a region surrounded by the second conductor, the third conductor, and the first conductor, by capacitance of the first gap, is provided.

Advantageous Effects of Invention

According to the present invention, an antenna that is small and resonates at a plurality of frequencies can be provided.

DESCRIPTION OF EMBODIMENTS

First Exemplary Embodiment

Figure 1:
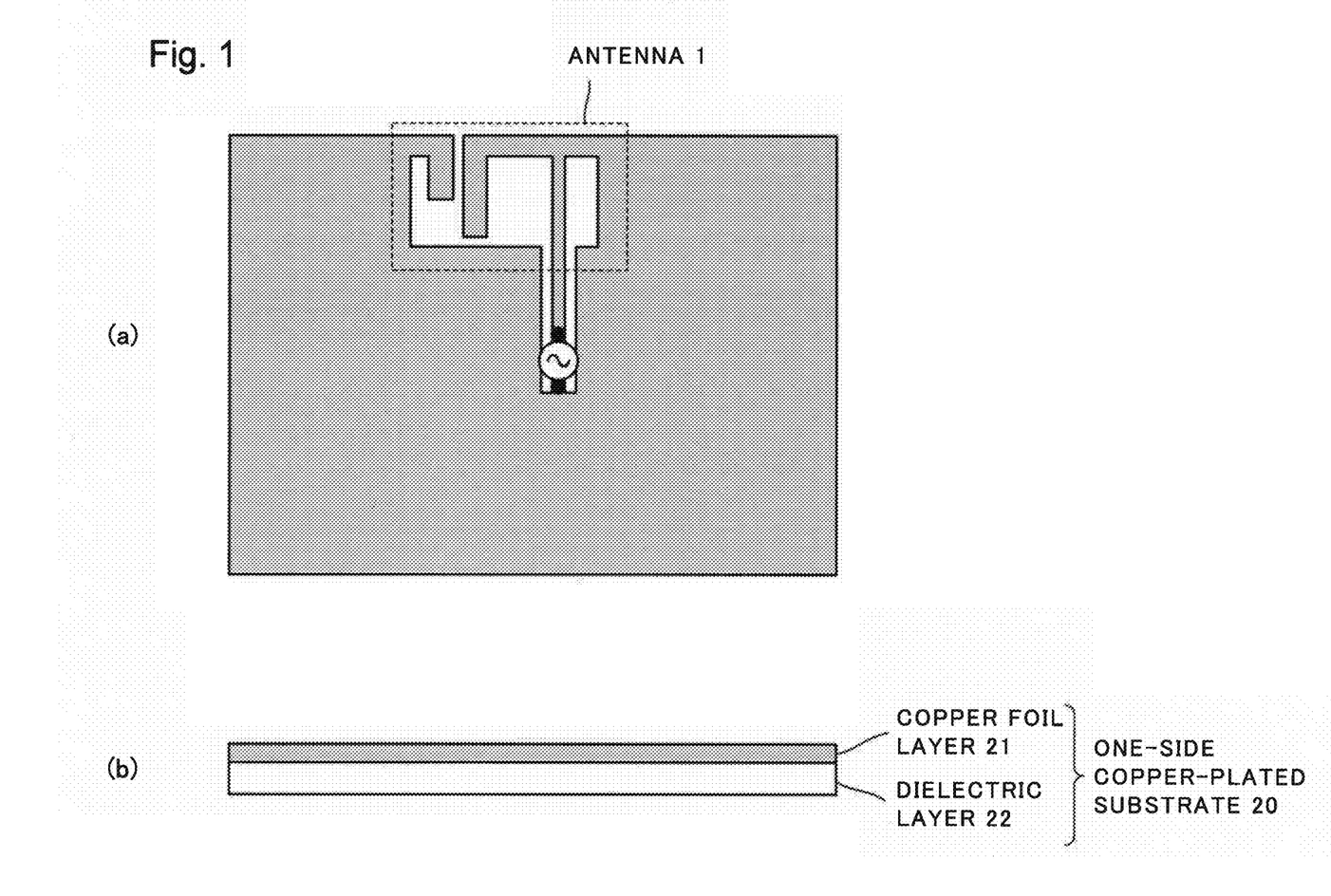
FIG. 1 is a diagram depicting a configuration example according to a first exemplary embodiment.

[Description of Configuration]
In the following, an exemplary embodiment of the present invention will be described with reference to the drawings.
FIG. 1(a) and FIG. 1(b) are diagrams depicting a configuration according to the exemplary embodiment. FIG. 1(a) is a top view of an antenna forming surface viewed from an upper surface, and FIG. 1(b) is a cross sectional view of the antenna forming surface viewed from a side.
As depicted in FIG. 1(a) and FIG. 1(b), an antenna 1 is formed of a one-side copper-plated substrate 20. The one-side copper-plated substrate 20 is constituted by a copper foil layer 21 and a dielectric layer 22. The antenna 1 is formed by exfoliating a copper foil along a desired antenna shape from the copper foil layer 21 by etching, laser processing, or the like. The antenna formed by exfoliating the copper foil is depicted in FIG. 1(a). In FIG. 1(a), a black part indicates a copper foil part and a white part indicates a part where the copper foil is exfoliated.

Figure 2:
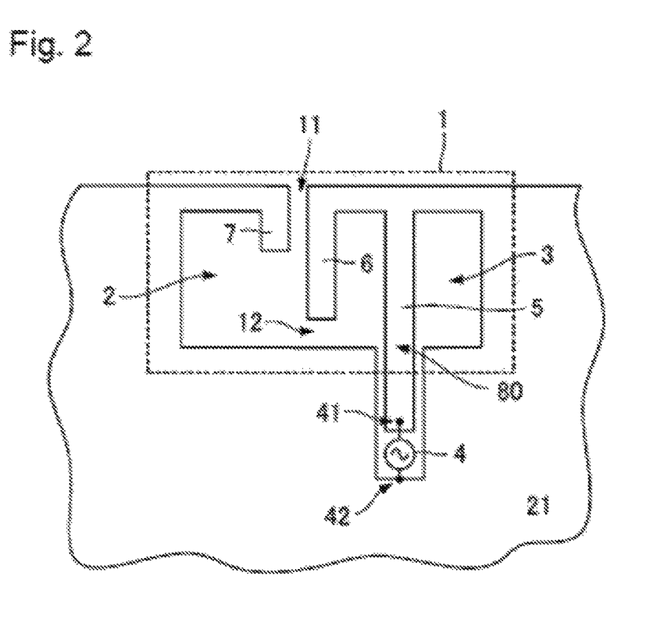
FIG. 2 is a diagram depicting the configuration example according to the first exemplary embodiment.

FIG. 2 is an enlarged view of FIG. 1(a). With reference to FIG. 2, the antenna 1 has an aperture 2 and an aperture 3. The aperture 2 and the aperture 3 are separated from each other by a transmission line 5. The transmission line 5 is coupled to one terminal 41 of a feeding point 4 having two terminals, each of which has one end positioned outside the aperture. The other terminal 42 of the feeding point 4 is coupled to the copper foil layer 21 neighboring the feeding point 4. Furthermore, the aperture 2 has an air gap 11 at regular intervals. To end portions of a conductor that hold the air gap 11, an auxiliary conductor 6 and an auxiliary conductor 7 are coupled. The auxiliary conductor 6 and the auxiliary conductor 7 are arranged so as to be opposed to each other inside the aperture 2.

[Description of Operation]

Next, an operation according to the exemplary embodiment will be described with reference to the drawings.

A high-frequency electric current fed to the feeding point 4, as illustrated in FIG. 2, passes through the transmission line 5 and is transmitted to a region of the aperture 2 and the aperture 3. A characteristic impedance of the transmission line 5 performs impedance matching with a wireless circuit coupled to the transmission line 5. The characteristic impedance is, for example, 50 ohm. Herein, a feeding point of the antenna 1 "on operation" is near a position 80 on the transmission line 5, as illustrated in FIG. 2. Even when being extended by the transmission line 5 from the position 80 on the transmission line 5 to the feeding point 4 at an arbitrary position in the copper foil layer 21, an operation of the antenna is unchanged regardless of a position of the feeding point 4. Note that, in FIG. 2, the transmission line 5 from the position 80 to the feeding point 4 is constituted by a coplanar line. However, the transmission line 5 of the section may be a transmission line other than the coplanar line, such as a coaxial line, so that an external conductor may be soldered with the copper foil layer 21 to be equipotential thereto.

Figure 3:
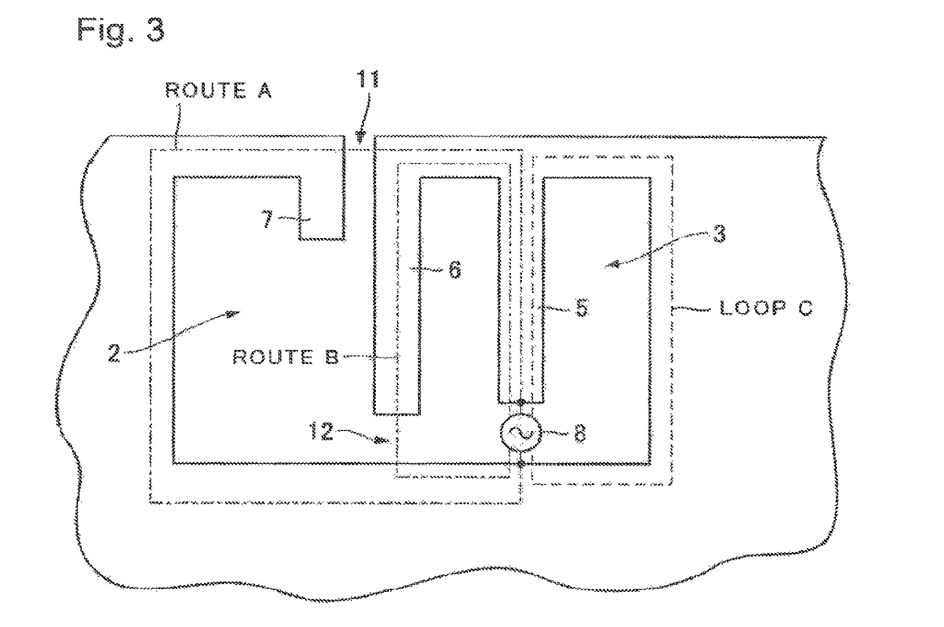
FIG. 3 is a diagram illustrating an operation according to the first exemplary embodiment.

FIG. 3 is a diagram illustrating an operation of the antenna 1. A point that is different from the configuration illustrated in FIG. 2, is that a feeding point 8 on operation 8 is illustrated instead of the feeding point 4 illustrated in FIG. 2. The other configuration is the same as the configuration illustrated in FIG. 2. With reference to FIG. 3, a route A that resonates at a first frequency, a route B that resonates at a second frequency, and a loop C for performing matching with a characteristic impedance of a feeding line at the first frequency and the second frequency are present. In the following, the operation of the antenna 1 for the route A, the route B, and the loop C will be described separately.

An air gap 11 between conductors is present on a path of the route A illustrated in FIG. 3. An opposing part by the auxiliary conductor 6 and the auxiliary conductor 7 positioned on both ends of the air gap 11 generates capacitance. The capacitance is proportional to an inverse of a distance of an interval between the auxiliary conductor 6 and the auxiliary conductor 7, and to an area of the opposing part by the auxiliary conductor 6 and the auxiliary conductor 7. The area herein is what is obtained by multiplying a length of the opposing part by a thickness of the copper foil layer. When it is feasible only by the capacitance of the conductors opposing at the air gap 11, the auxiliary conductor 7 is unnecessary.

Moreover, a length of a conductor of the route A illustrated in FIG. 3 generates an inductance. When a high-frequency electric current is fed to the feeding point 8 on operation, illustrated in FIG. 3, the route A forms a series resonant circuit expressed by an equivalent circuit, in which an inductor 9 and a capacitor 10 are serially connected to a feeding point 17, illustrated in FIG. 4. The route A resonates at a first resonance frequency. In general, a resonance frequency of a series resonant circuit is inversely proportional to a square root of a value obtained by multiplying an inductance by capacitance.

Accordingly, the first resonance frequency is inversely proportional to a square root of a value obtained by multiplying the inverse of the distance of the interval between the auxiliary conductor 6 and the auxiliary conductor 7 by the area of the opposing part by the auxiliary conductor 6 and the auxiliary conductor 7, and the length of the conductor of the route A.

The above-described antenna utilizing the resonance of the route A is described in PTL 1, and referred to as a split ring resonator antenna (SRR antenna).

When the route A satisfies the above-described condition, the antenna is not necessarily limited to the SRR antenna.

On the other hand, the antenna according to the exemplary embodiment has the route B that resonates at a second resonance frequency illustrated in FIG. 3, in addition to the route A that resonates at the first resonance frequency described above. The route B illustrated in FIG. 3 has a gap 12 between an opening tip of the auxiliary conductor 6 and the copper foil layer 21 forming the aperture 2. The gap 12 generates capacitance. The capacitance is proportional to an inverse of a distance of an interval of the gap 12 between the tip of the auxiliary conductor 6 and the copper foil layer 21 around the aperture 2 near the tip, and to a facing area by conductors that hold the gap 12.

Moreover, a length of a conductor of the route B generates an inductance. When a high-frequency electric current is fed to the feeding point 8 on operation, illustrated in FIG. 3, the route B forms a series resonant circuit expressed by an equivalent circuit illustrated in FIG. 4. The route B resonates at the second resonance frequency. As is the case with the description of the route A, a resonance frequency of the series resonant circuit is inversely proportional to a square root of a value obtained by multiplying an inductance by capacitance.

Therefore, the second resonance frequency is inversely proportional to a square root of a value obtained by multiplying the inverse of the distance of the interval of the gap 12 between the tip of the auxiliary conductor 6 and the copper foil layer 21 around the aperture 2 near the tip by the facing area of the conductors holding the gap 12 and the length of the conductor of the route B.

In this way, the antenna 1 has a two-frequency resonance characteristic, which stems from two different shapes of the route A and the route B.

Next, the loop C will be described. A length of a conductor of the loop C generates an inductance between both terminals of the feeding point 8. The antenna 1 performs impedance matching with the characteristic impedance of the feeding line coupled to the feeding point 8 at the first frequency and the second frequency by the inductance that stems from the length of the conductor of the loop C.

Hereinabove, the operation of the antenna 1 according to the first exemplary embodiment has been described.

Next, a design example of the antenna 1 will be illustrated with reference to FIGS. 5 and 6.

A design target is to assume the first frequency to be f0 and the second frequency to be 2.7×f0, and to achieve a reflection loss to be −10 dB or less observed at the feeding point 8 at the first and second frequencies. Note that respective sizes indicated below are normalized by a spatial wavelength La corresponding to the resonance frequency f0 of the route A.

Figure 5:
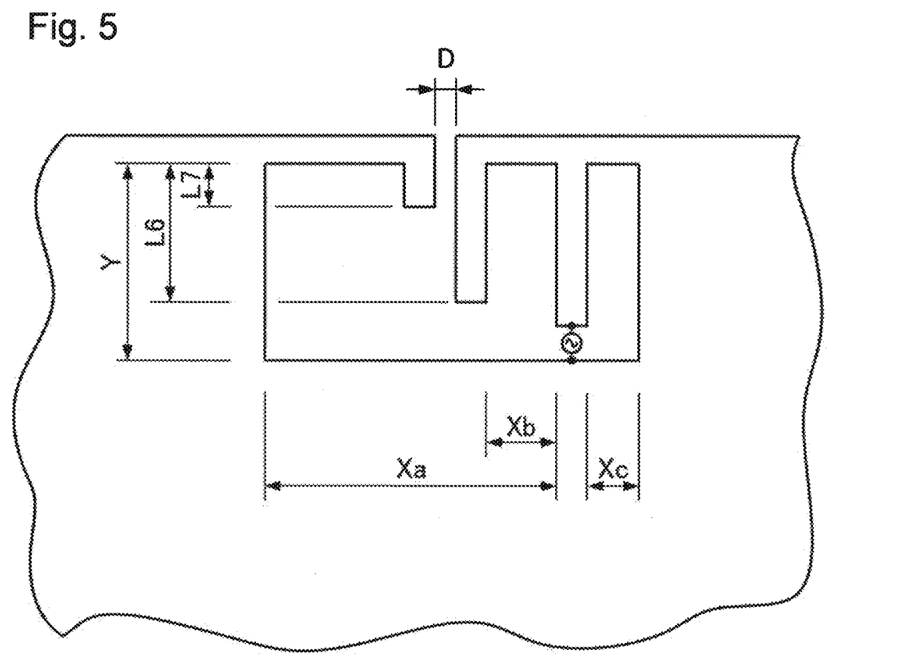
FIG. 5 is a diagram illustrating the operation according to the first exemplary embodiment.

The respective sizes indicated in FIG. 5 are assumed to be Xa=0.088·La, Xb=0.044·La, Xc=0.026·La, Y=0.028·La, and D=0.00080·La. Moreover, a width of any of the auxiliary conductor 6, the auxiliary conductor 7, and the transmission line 5 is assumed to be 0.0040·La. The length of the auxiliary conductor 6 is assumed to be L6=0.026·La, the length of the auxiliary conductor 7 is assumed to be L7=0.020·La, and the thickness of the copper foil is assumed to be 0.00080·La.

Figure 6:
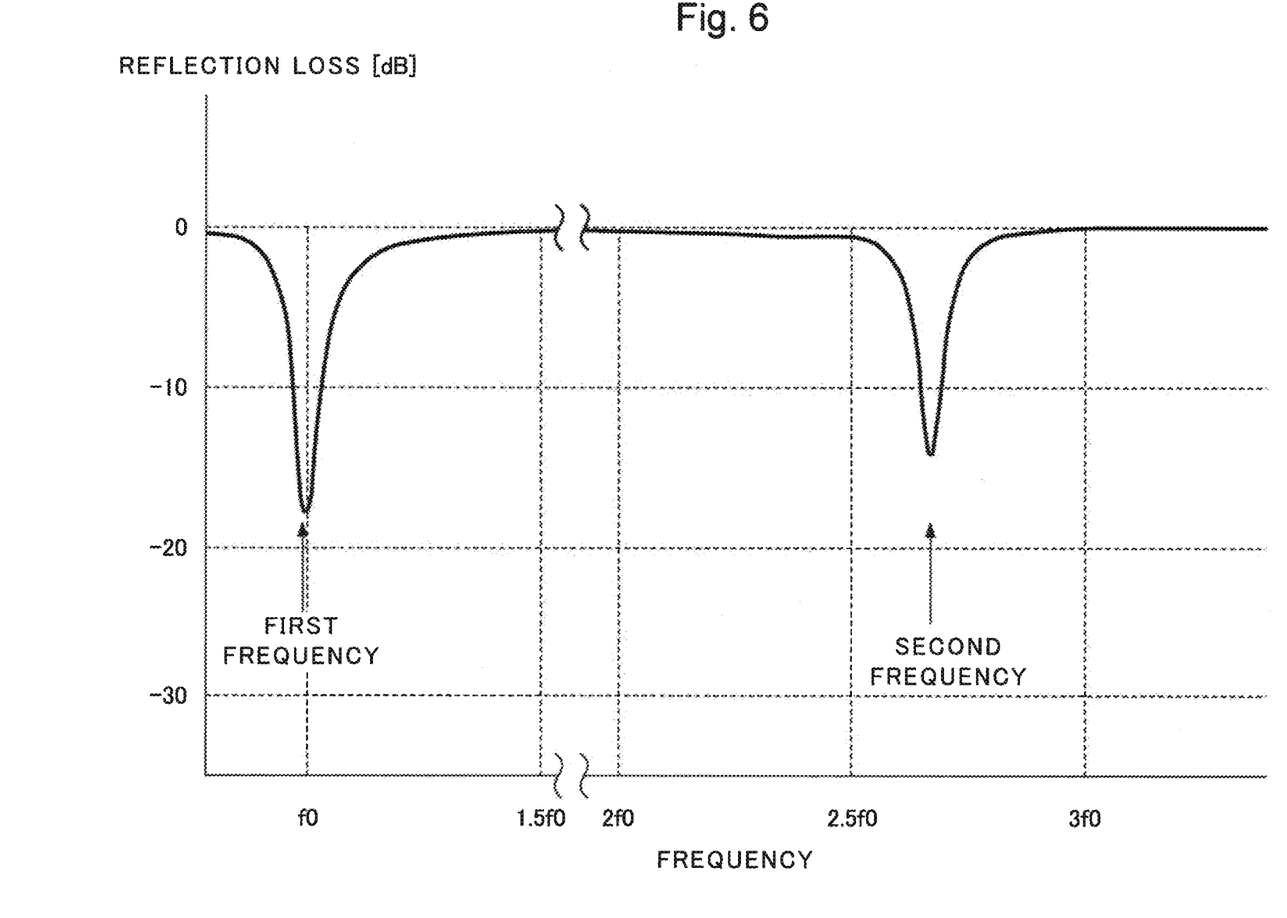
FIG. 6 is a diagram illustrating the operation according to the first exemplary embodiment.

FIG. 6 is a graph illustrating the impedance at the feeding point of the antenna 1 in the form of a reflection loss (return loss) by performing numerical calculation based on these design values. As illustrated in FIG. 6, the first frequency (f0) and the second frequency (2.7×f0), that are the targets, resonate. The reflection loss at the first and second frequencies is −10 dB or less, that is the target.

Herein, as illustrated in FIG. 3, a shape of the aperture of the antenna is a rectangle. However, the shape of the aperture may be designed to be a shape other than a rectangle, such as a circle or a polygon.

As described above, the antenna according to the first exemplary embodiment can resonate at a plurality of frequencies with one element. Accordingly, as described in Japanese patent application No. 2012-248169, the antenna according to the exemplary embodiment is small and can correspond to a plurality of frequencies, compared with the case realizing correspondence to two frequencies by two elements.

Second Exemplary Embodiment

Figure 7:
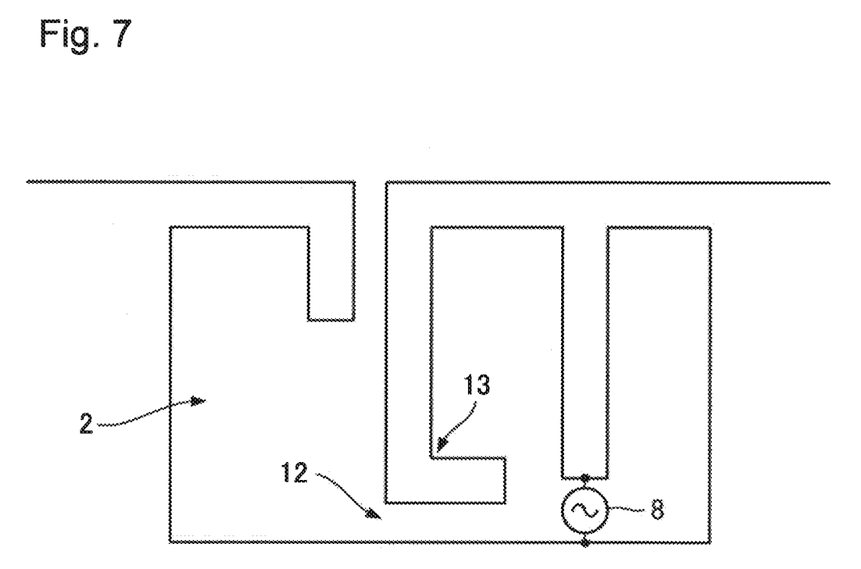
FIG. 7 is a diagram depicting a configuration example according to a second exemplary embodiment.

Next, a second exemplary embodiment of the present invention will be described with reference to the drawings.
[Description of Configuration]
FIG. 7 is a diagram depicting a configuration according to the exemplary embodiment. When comparing an antenna shape illustrated in FIG. 7 with the antenna shape illustrated in FIG. 3 used for the description of the first exemplary embodiment, a tip portion of the auxiliary conductor 6 is bent at a bending part 13, and the tip portion from the bending part 13 is opposed to a periphery of an aperture 2 that holds a gap 12.
[Description of Operation]
Even when a distance of an interval of the gap 12 with an antenna shape illustrated in FIG. 3 according to the first exemplary embodiment is of the same size as that of the gap 12 illustrated in FIG. 7, the antenna shape illustrated in FIG. 7 has a greater conductor part opposed to the periphery of an aperture 3 at the tip of the auxiliary conductor 6 than the antenna shape illustrated in FIG. 3. Therefore, capacitance generated between the tip portion of the auxiliary conductor 6 and the periphery of the aperture 2 in the antenna shape illustrated in FIG. 7 is greater than that of the antenna shape illustrated in FIG. 3.

Figure 4:
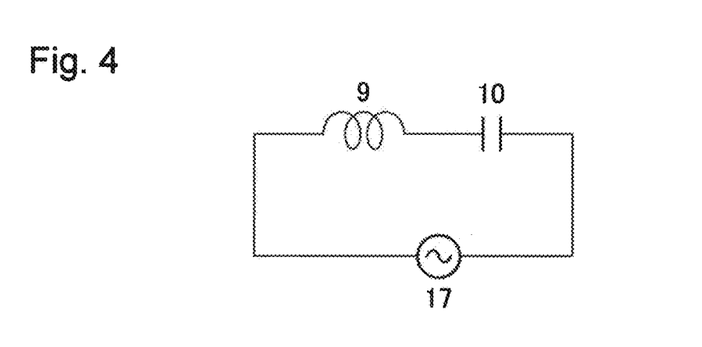
FIG. 4 is a diagram illustrating the operation according to the first exemplary embodiment.

An equivalent circuit of the antenna according to the second exemplary embodiment is the same as the equivalent circuit illustrated in FIG. 4 according to the first exemplary embodiment, and is a series resonant circuit. As described in the first exemplary embodiment, a resonance frequency of a series resonant circuit is inversely proportional to a square root of a value obtained by multiplying an inductance by capacitance. Therefore, when capacitance generated at the gap 12 increases, accompanied by a change of the shape of the tip portion of the auxiliary conductor 6, the inductance is required to be decreased in order to resonate at the same resonance frequency. Herein, the inductances illustrated in FIGS. 7 and 3 are determined by an electrical length indicated by the route A illustrated in FIG. 3. That is, when the capacitance generated at the gap 12 is increased, the electrical length indicated by the route A illustrated in FIG. 3 is required to be decreased in order to resonate at the same frequency, and therefore, the antenna shape becomes smaller.

Accordingly, the antenna shape illustrated in FIG. 7 according to the second exemplary embodiment can be downsized, compared with the antenna shape illustrated in FIG. 3 according to the first exemplary embodiment.

Third Exemplary Embodiment

Figure 9:
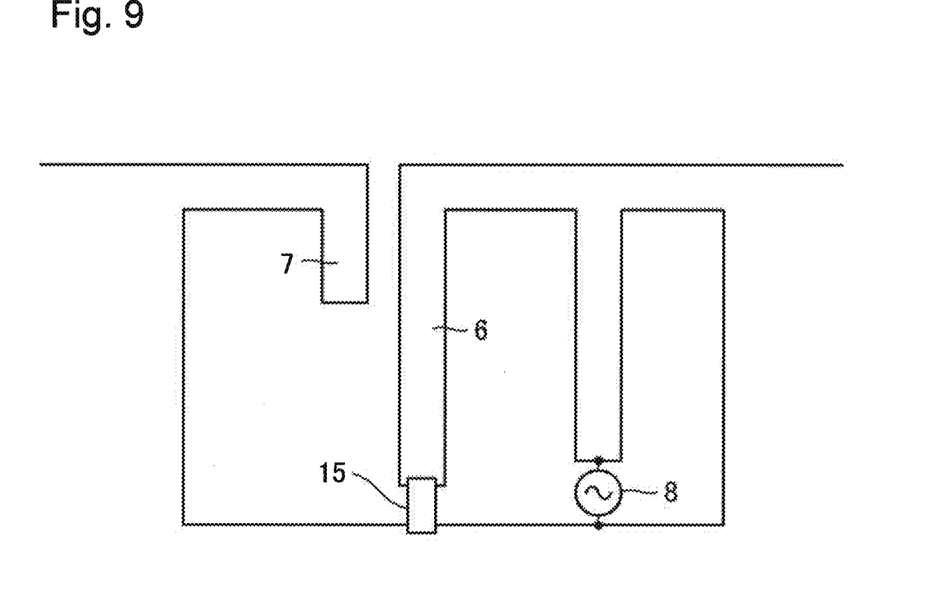
FIG. 9 is a diagram depicting a configuration example according to a third exemplary embodiment.

Next, a third exemplary embodiment of the present invention will be described with reference to the drawings.
[Description of Configuration]
FIG. 9 is a diagram depicting a configuration according to the exemplary embodiment. An antenna shape illustrated in FIG. 9 is different from the antenna shape illustrated in FIG. 3 used for the description of the first exemplary embodiment in including a capacitor 15 of a chip part between the tip of the auxiliary conductor 6 and the conductor 15 around the aperture 2 neighboring the auxiliary conductor 6.
[Description of Operation]
In the first exemplary embodiment, capacitance is generated at the gap 12 between the tip of the auxiliary conductor 6 and the copper foil layer 21 around the aperture 2. On the other hand, in the third exemplary embodiment, by loading the capacitor 15 of the chip part in the gap 12, an outer shape of the antenna can be downsized even when capacitance between conductors that hold the gap 12 as described in the first exemplary embodiment is insufficient.

Figure 10:
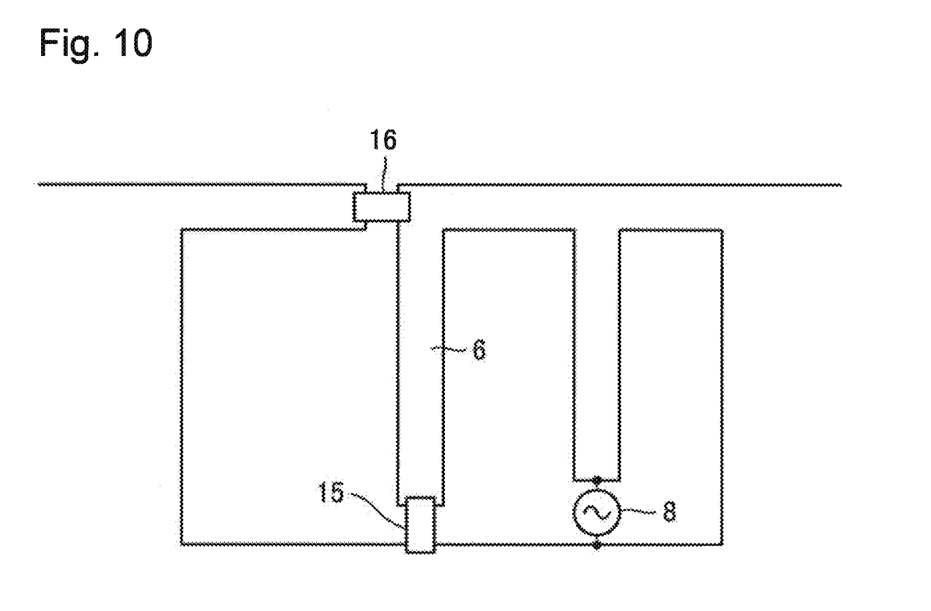
FIG. 10 is a diagram depicting the configuration example according to the third exemplary embodiment.

Note that the method of loading the capacitor 16 of the chip part in an air gap 11 is described in PTL 1. Capacitance at the air gap 11 can be used as the capacitor 16 of the chip part as is the case with the gap 12 as illustrated in FIG. 10.

Fourth Exemplary Embodiment

Figure 11:
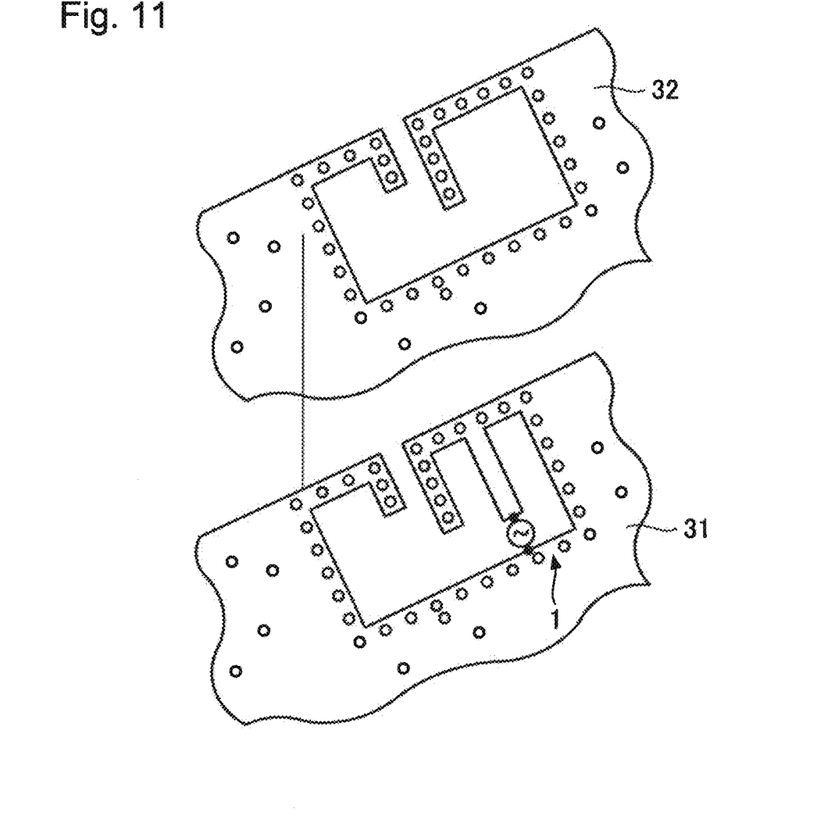
FIG. 11 is a diagram depicting a configuration example according to a fourth exemplary embodiment.

Next, a fourth exemplary embodiment of the present invention will be described with reference to the drawings.
[Description of Configuration]
FIG. 11 is a diagram depicting a configuration according to the exemplary embodiment. The antenna 1 illustrated in FIG. 3 used for the description of the first exemplary embodiment is formed on a first conductor formation surface 31. On an upper surface of the first conductor formation surface 31, a second conductor formation surface 32 is arranged by holding a dielectric layer having a constant thickness. On the second conductor formation surface 32, a conductor shape obtained by removing the transmission line 5 and the feeding point 4 from the conductor shape of the antenna 1 illustrated in FIG. 3 is formed.

Moreover, the conductor on the first conductor formation surface 31 and the conductor on the second conductor formation surface 32 are conducted via a plurality of through holes of a print substrate, and therefore, both the conductors are kept equipotential at high frequencies.
[Description of Operation]
In the antenna according to the fourth exemplary embodiment, the first conductor formation surface 31 and the second conductor formation surface 32 are connected via the plurality of through holes, and therefore, the configuration of the antenna is equivalent to a configuration where the interval between the first conductor formation surface 31 and the second conductor formation surface 32 is filled with a conductor to form an antenna. Therefore, compared with the antenna formed only by one conductor formation surface according to the first exemplary embodiment, the antenna formed by two conductor formation surfaces connected via through holes according to the fourth exemplary embodiment has greater facing area between the conductors at the air gap 11, and has greater capacitance.

The antenna according to the fourth exemplary embodiment has greater capacitance at the gap 12 than the antenna according to the first exemplary embodiment for the same reason. When capacitance is greater, the outer shape of the antenna can be made smaller, as described in the description of operation for the second exemplary embodiment.

In this way, the antenna according to the fourth exemplary embodiment can be made smaller than the antenna according to the first exemplary embodiment.

Fifth Exemplary Embodiment

Figure 12:
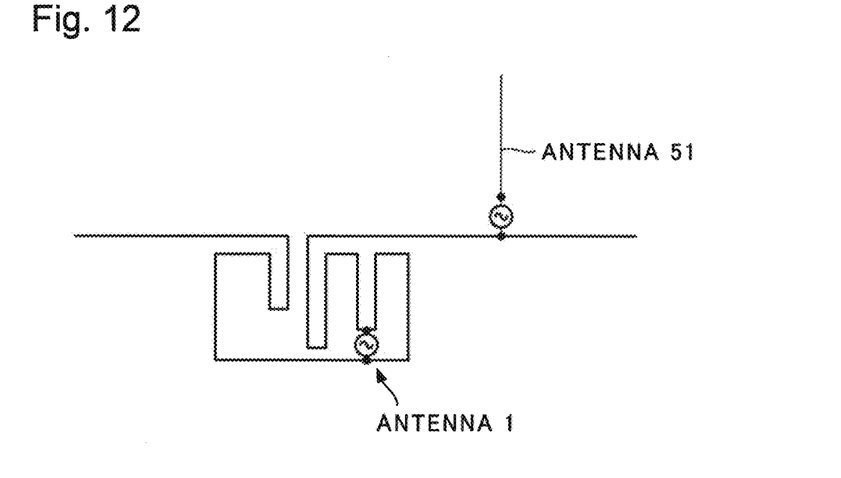
FIG. 12 is a diagram depicting a configuration example according to a fifth exemplary embodiment.

Next, a fifth exemplary embodiment will be described with reference to the drawings.
[Description of Configuration]
FIG. 12 is a diagram depicting a configuration according to the fifth exemplary embodiment.

As illustrated in FIG. 12, an antenna 51 is arranged at a position neighboring an antenna 1. The antenna 1 has the same configuration as the antenna 1 according to the first exemplary embodiment. However, a frequency of an operation purpose is only the resonance frequency of the route A illustrated in FIG. 3 used in the description of the first exemplary embodiment (hereinafter referred to as "frequency F1"). The resonance frequency of the route B is not the frequency of the operation purpose of the antenna 1. Moreover, a resonance frequency of the antenna 51 (hereinafter referred to as "frequency F51") is a frequency higher than that of the antenna 1.

Note that, in FIG. 12, the antenna 51 is illustrated as a monopole antenna. However, the antenna 51 may be an antenna of the other type, such as an SRR antenna.
[Description of Operation]
Next, an operation according to the exemplary embodiment will be described with reference to FIGS. 3, 12, and 13.

Electromagnetic coupling in a space between the antenna 1 and the antenna 51 illustrated in FIG. 12 is present, and presence of the antenna 1 may have an adverse effect on a characteristic of the antenna 51. In order to avoid the electromagnetic coupling in the space, there is a method of setting the antenna 1 to a high reactance at the frequency F51.

For example, an impedance adjustment circuit may be configured between the antenna 1 and the feeder line to match a characteristic impedance of the feeding line at the frequency F1 and to form a circuit having a high reactance at the frequency F51. However, the above-described method is difficult to be realized when the frequency F1 is not sufficiently separated from the frequency F51.

As is evident from FIG. 3, the impedance of the resonance frequency of the route A (frequency F1) of the antenna 1 scarcely changes, even when the shape of the route B described in the first exemplary embodiment is changed. On the other hand, accompanied by a change of the shape of the route B, the impedance at the frequency 51 can be changed. That is, by changing the inductance which stems from an electrical length of the route B illustrated in FIG. 3, and capacitance generated at the gap 12, the reactance of the antenna 1 at the frequency F51 can be designed to be of a high value, and can cause the antenna to have an impedance of almost an open circuit.

Figure 13:
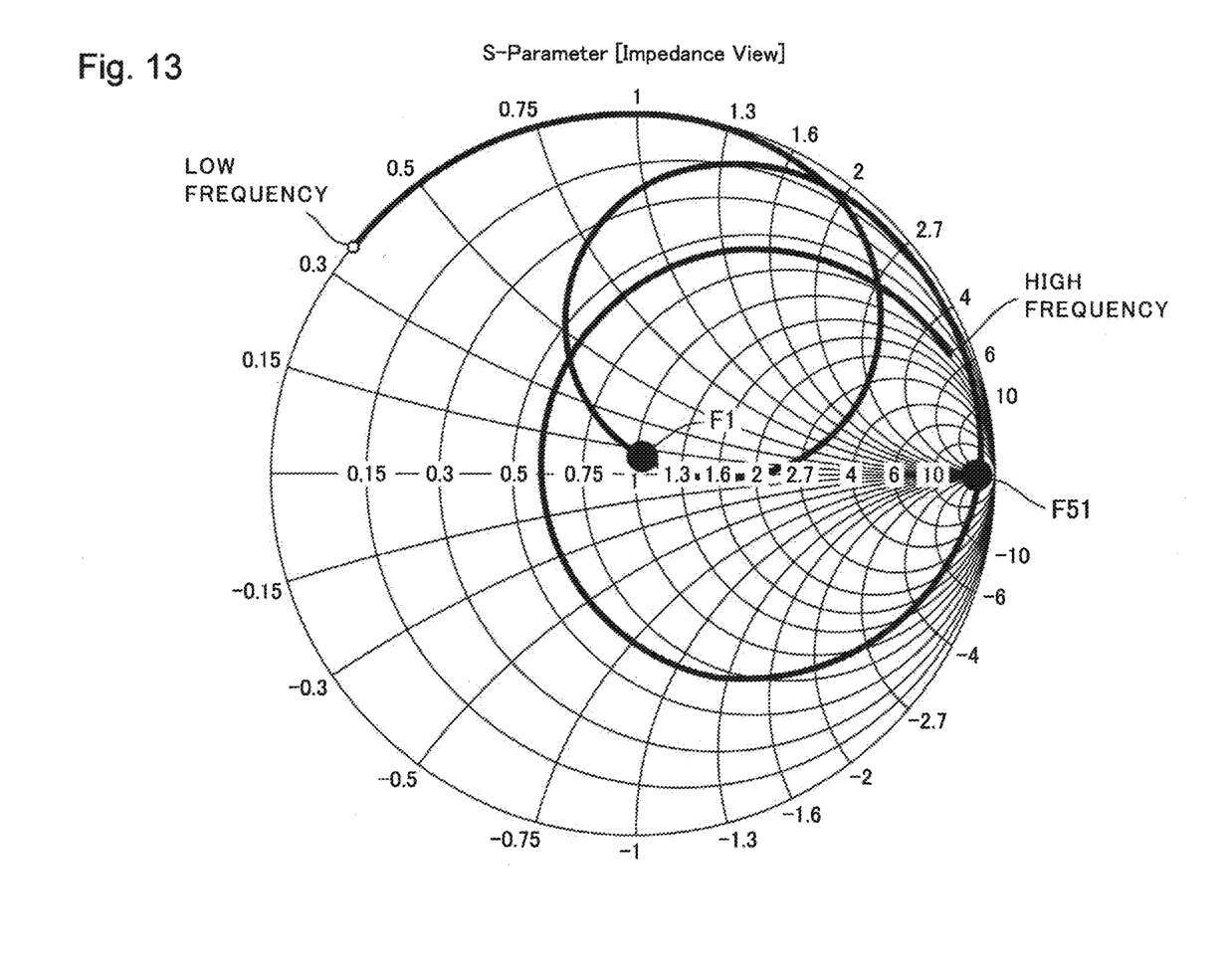
FIG. 13 is a diagram illustrating an operation according to the fifth exemplary embodiment.

FIG. 13 is a diagram illustrating on a Smith chart the impedance by numerical analysis of the antenna 1 designed based on the above description. The antenna 1 is illustrated to almost match the characteristic impedance of the transmission line at the frequency F1. The impedance of the antenna 1 at the resonance frequency F51 of the antenna 51 is illustrated to be almost an open circuit impedance with a high reactance.

In this way, the electromagnetic coupling in a space between the antenna 1 and the antenna 51 becomes sparse. Then, it becomes possible to avoid an adverse effect by the antenna 1 on the characteristic of the antenna 51 almost without changing the impedance of the antenna 1 at the frequency F1.

Note that, when a length of a conductor of the route B is increased with respect to the shape of the antenna 1 illustrated in FIG. 13 without changing the length of the conductor of the route A, a point indicating the frequency F1 does not move, but a point indicating the frequency F51 moves clockwise almost along a trajectory of the graph. Moreover, a frequency closest to the open-circuit impedance is higher than the frequency F15.

Sixth Exemplary Embodiment

Figure 14:
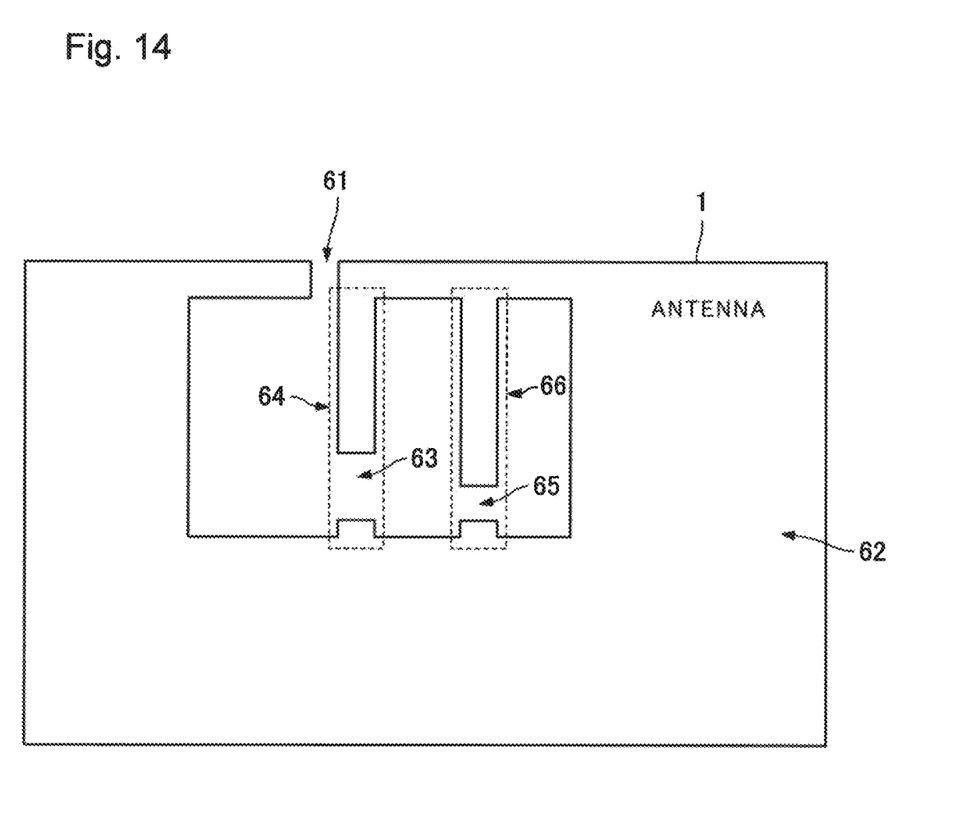
FIG. 14 is a diagram depicting a configuration example according to a sixth exemplary embodiment.

Next, a sixth exemplary embodiment of the present invention will be described with reference to FIG. 14.

An antenna 1 according to the exemplary embodiment includes: a first conductor 62 of a ring shape, having an air gap 61; and a second conductor 64 arranged inside the ring with both ends coupled to the first conductor 62, and having a first gap 63. Furthermore, the antenna 1 includes a third conductor 66 arranged in a region surrounded by a part not including the air gap 61 out of the first conductor 62, and the second conductor 64, with both ends coupled to the first conductor 62, and having a second gap 65.

Then, the antenna 1 has a first value and a second value based on the above configuration.

The first value is a value obtained by multiplying a length of an outer periphery of a region surrounded by a part including the air gap 61 out of the first conductor 62, and the third conductor 66, by capacitance of the air gap 61.

On the other hand, the second value is a value obtained by multiplying a length of an outer periphery of a region surrounded by the second conductor 64, the third conductor 66, and the first conductor 62, by capacitance of the first gap 63.

In the antenna 1 according to the exemplary embodiment, the first value is different from the second value.

In this way, the antenna according to the sixth exemplary embodiment can resonate at a plurality of frequencies with one element. Accordingly, as described in Japanese patent application No. 2012-248169, the antenna according to the exemplary embodiment is small and can correspond to a plurality of frequencies, compared with the case realizing correspondence to two frequencies by two elements.

Hereinabove, preferred exemplary embodiments of the present invention have been described. However, the present invention is not limited to the above-described exemplary embodiments, and may be expanded or modified as follows.

Figure 16:
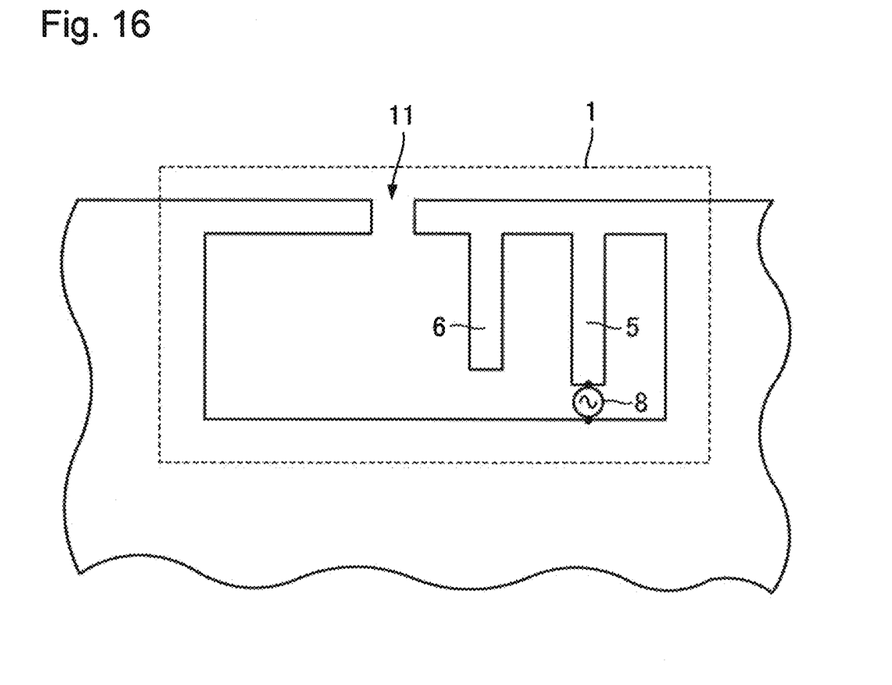
FIG. 16 is a diagram depicting a variation of a configuration according to the first exemplary embodiment.

For example, the first exemplary embodiment of the present invention may be modified, so that the auxiliary conductor 6 may be deviated toward the transmission line 5 from the end portion of an air gap 11, as illustrated in FIG. 16, and coupled to an inner periphery of the aperture.

Figure 17:
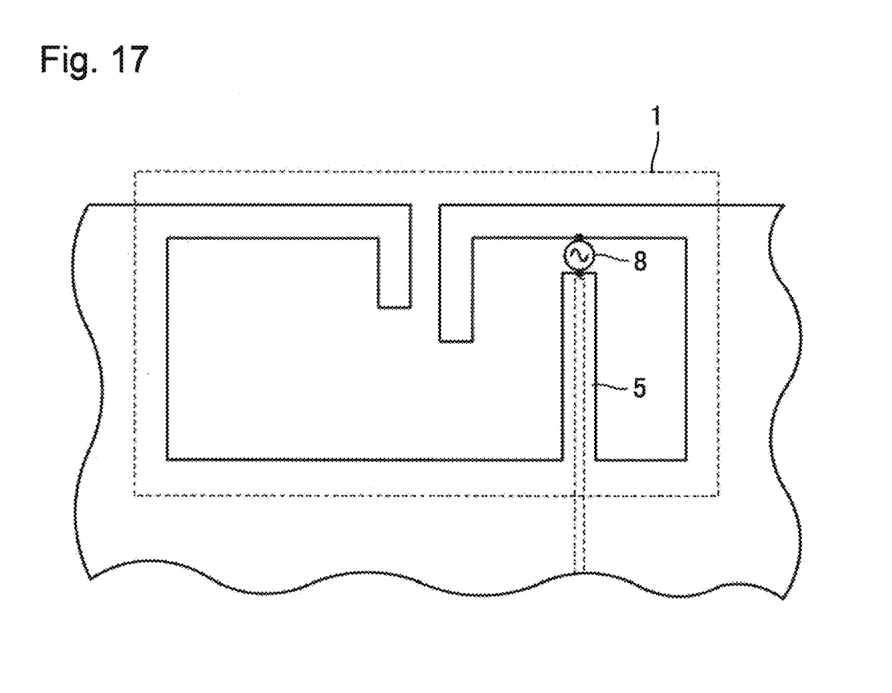
FIG. 17 is a diagram depicting a variation of a configuration according to the first exemplary embodiment.

Moreover, the first exemplary embodiment of the present invention may be modified, so that the feeding point 8 on operation may be moved by causing a strip line of the transmission line 5 to be extended into an inside of the aperture, as illustrated in FIG. 17.

Figure 8:
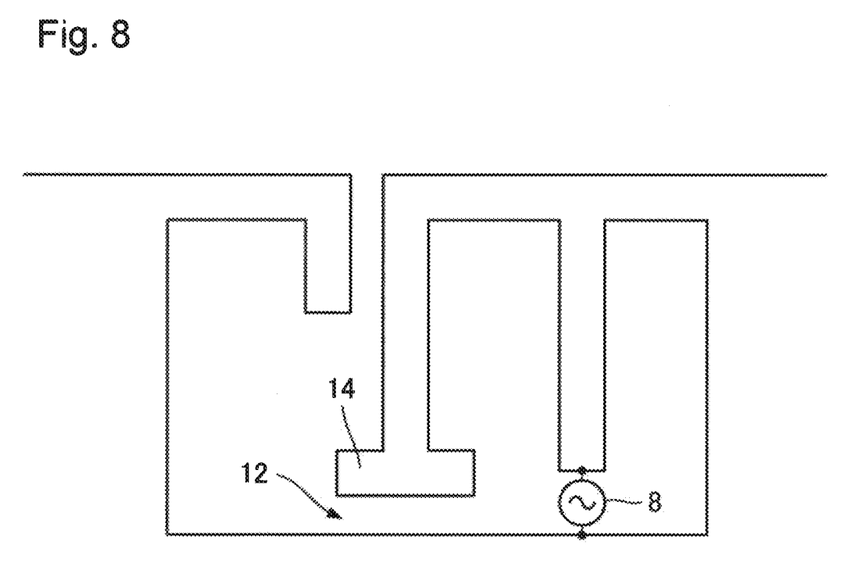
FIG. 8 is a diagram depicting a variation of a configuration according to the second exemplary embodiment.

Alternatively, in the second exemplary embodiment of the present invention, as illustrated in FIG. 7, the auxiliary conductor 6 has a shape of a tip bent at the bending part 13. On the other hand, as illustrated in FIG. 8, by deforming a tip from a portion corresponding to the bending part 13 to a shape enlarged from left to right like the tip part 14, capacitance formed by the conductor 1 around the tip part 14 and the aperture 2 can be increased. As a result, the shape of the antenna 1 can be downsized, compared with the shape of the antenna 1 illustrated in FIG. 7.

Figure 18:
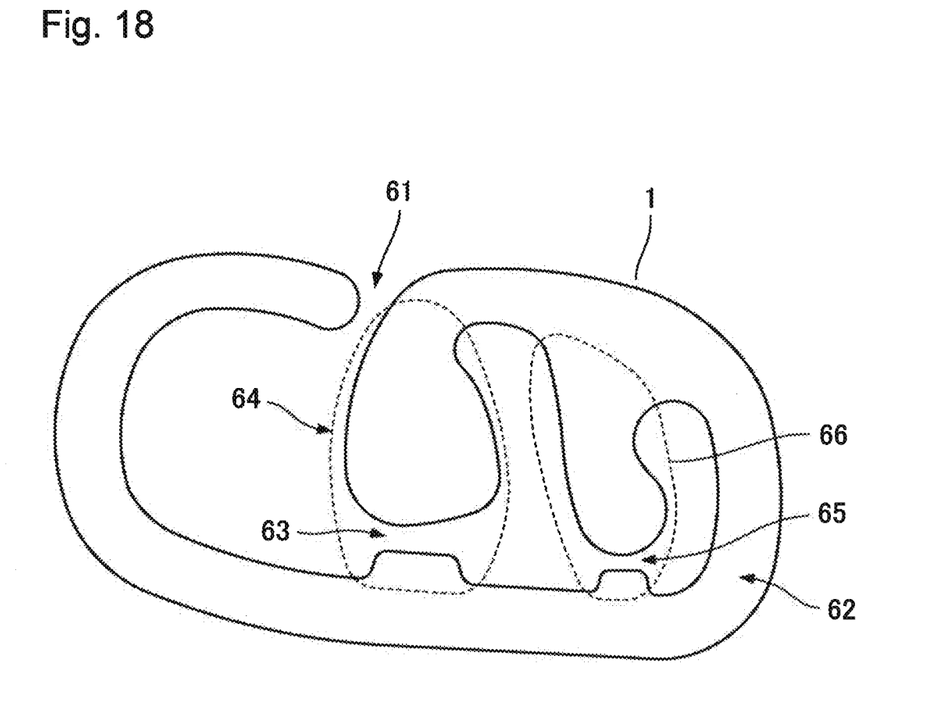
FIG. 18 is a diagram depicting a variation of a configuration according to the sixth exemplary embodiment.

Furthermore, when the condition described in the sixth exemplary embodiment of the present invention is satisfied, deformation of an antenna into a shape illustrated in FIG. 18 may be realized.

Hereinabove, the present invention has been explained by the above-described exemplary embodiments as exemplary examples. However, the present invention is not limited to the above-described exemplary embodiments. That is, various aspects understood by those skilled in the art may be applied within the scope of the present invention.

The present application claims priority based on Japanese patent application No. 2014-190945 filed on Sep. 19, 2014, and the entire disclosure are incorporated herein.

REFERENCE SIGNS LIST

1 Antenna
2 Aperture
3 Aperture
4 Feeding point
5 Transmission line
6 Auxiliary conductor
7 Auxiliary conductor
8 Feeding point on operation
9 Inductor
10 Capacitor
11 Air gap
12 Gap
13 Bending part
14 Tip part
15 Capacitor
16 Capacitor
17 Feeding point
20 One-side copper-plated substrate
21 Copper foil layer
22 Dielectric layer
31 First conductor formation surface
32 Second conductor formation surface
41 Terminal
42 Terminal
51 Antenna
61 Air gap
62 First conductor
63 First gap
64 Second conductor
65 Second gap
66 Third conductor
80 Position

What is claimed is:

1. An antenna comprising:
   a first conductor of a ring shape, having a first air gap;
   a second conductor arranged inside the ring-shaped first conductor wherein both ends of the second conductor are connected to the first conductor, the second conductor having a first gap;
   a third conductor arranged in a region surrounded by a part of the first conductor not including the first air gap and the second conductor, with both ends of the third conductor connected to the first conductor, the third conductor having a second gap;
   a fourth conductor arranged in a region surrounded by a part of the first conductor including the first air gap and the second conductor, and a second center line of the fourth conductor and a first center line of the second conductor are in approximately a same direction, respectively, and a distal end of the fourth conductor in a lengthwise direction is connected to the first conductor at a nearer point to the first air gap than of points of intersection where the first conductor intersects the second center line;
   a fifth conductor of a ring shape, the fifth conductor including a second air gap; and
   a sixth conductor arranged inside the ring-shaped fifth conductor, wherein both ends of the sixth conductor are connected to the fifth conductor, the sixth conductor having a third gap, wherein
   the first conductor, the second conductor, and the third conductor are formed on a first conductor formation surface,
   the fifth conductor and the sixth conductor are formed on a second conductor formation surface that is approximately parallel to the first conductor formation surface,
   a region surrounded by an orthogonal projection of an inner periphery of the ring-shaped fifth conductor onto the first conductor formation surface includes an inner periphery of the ring-shaped first conductor,
   the first conductor has conduction to the fifth conductor, and
   a value obtained by multiplying a length of an outer periphery of a region surrounded by the part of the first conductor including the first air gap and the third conductor, by a capacitance of the first air gap is different from a value obtained by multiplying a length of an outer periphery of a region surrounded by the second conductor, the third conductor, and the first conductor, by a capacitance of the first gap.

2. The antenna according to claim 1, wherein
   a space between the first conductor formation surface and the second conductor formation surface is filled with a dielectric layer in which a through hole for the conduction is formed.

3. A wireless communication apparatus including the antenna according to claim 1.

* * * * *